United States Patent Office
3,719,561
Patented Mar. 6, 1973

3,719,561
PROCESS FOR PRODUCING DIAMINOPIMELIC ACID
Katsunobu Tanaka, Machida-shi, and Kazuo Oshima and Yoh Tokoro, Tokyo, Japan, assignors to Kyowa Hakko Kogyo Co., Ltd., Tokyo, Japan
No Drawing. Continuation-in-part of application Ser. No. 663,217, Aug. 25, 1967. This application Aug. 7, 1968, Ser. No. 750,780
Claims priority, application Japan, Aug. 26, 1966, 41/55,832
Int. Cl. C12d 13/06
U.S. Cl. 195—28 R          14 Claims

ABSTRACT OF THE DISCLOSURE

A process for producing diaminopimelic acid which comprises culturing a microorganism capable of producing diaminopimelic acid under aerobic conditions in an aqueous nutrient medium containing at least one hydrocarbon as the main carbon source, and accumulating and recovering said diaminopimelic acid from the resultant culture liquor. Hydrocarbons which may be employed include, for example, n-paraffins, perferably having from 11 to 18 carbon atoms, kerosene, light oils, heavy oils, paraffin oils, naphtha, etc. Particular lysine-requiring strains of hydrocarbon-assimilating microorganisms are especially preferred in the process, for example, *Arthrobacter paraffineus* ATCC 21087 and 21088, *Brevibacterium ketoglutamicum* ATCC 21089 and *Corynebacterium hydrocarboclastus* ATCC 21090.

---

This application is a continuation-in-part of application Ser. No. 663,217, filed on Aug. 25, 1967, now abandoned.

This invention relates to a process for producing diaminopimelic acid. More particularly, it relates to a process for the production of diaminopimelic acid by fermentation. Even more particularly, the invention relates to a process for the production of diaminopimelic acid by fermentation with microorganisms in a culture medium containing hydrocarbons as the main source of carbon.

Methods for the production of diaminopimelic acid by the use of microorganisms have been known in the prior art. For example, a method for accumulating diaminopimelic acid in a culture medium by the use of a lysine-requiring strain of Escherichia (U.S. Pat. 2,771,396), a method using a lysine-requiring mutant strain of *Micrococcus glutamicus* [Amino Acid, volume 3, p. 83 (1961)] and the like have been reported in the literature. However, all of these methods involve the production of diaminopimelic acid from carbohydrates as the starting material. On the other hand, Yamada et al. have reported the accumulation of various amino acids from hydrocarbons [Agricultural and Biological Chemistry, vol. 27, pp. 390–395 (1963)]. However, in this latter case, the amounts of amino acids produced are quite small. Accordingly, none of these prior art methods is satisfactory for the production of diaminopimelic acid on an industrial scale.

Accordingly, one of the objects of the present invention is to provide an improved process for the production of diaminopimelic acid which overcomes the disadvantages and deficiencies of the prior art methods.

Another object of the present invention is to provide a process for producing diaminopimelic acid by fermentation which may be carried out in an efficacious and simple manner.

A further object of the invention is to provide a process for producing diaminopimelic acid by fermentation which may be carried out advantageously on an industrial scale at low cost to give a high yield of product.

These and other objects and advantages of the present invention will become apparent to those skilled in the art from a consideration of the following specification and claims.

In accordance with the present invention, there has been developed a fermentation process for producing diaminopimelic acid, which is an important precursor of L-lysine, in high yields. This process involves carrying out fermentation with certain mutant strains, having the capability of assimilating hydrocarbons, in an aqueous nutrient medium. Hydrocarbons are employed therein as the main source of carbon.

As suitable microorganisms to be employed in the present invention, there may be mentioned, by way of example, the following strains:

*Arthrobacter paraffineus* No. 2411–U–35 ATCC 21087
*Arthrobacter paraffineus* No. 2411–U–118 ATCC 21088
*Corynebacterium hydrocarboclastus* No. 2438–U–29 ATCC 21090
*Brevibacterium ketoglutamicum* No. 2473–U–41 ATCC 21089

The above strains are capable of assimilating hydrocarbons and are obtained by the ultraviolet irradiation of the appropriate respective parent strains. The resultant mutant strains require lysine for their growth. The parent strains of the mutant microorganisms listed immediately hereinabove are, respectively, as follows:

*Arthrobacter paraffineus* No. 2411 ATCC 15591
*Arthrobacter paraffineus* No. 2411 ATCC 15591
*Corynebacterium hydrocarboclastus* No. 2438 ATCC 15592
*Brevibacterium ketoglutamicum* No. 2473 ATCC 15588

As for the culture medium to be employed in the fermentation, either a synthetic culture medium or a natural nutrient medium is suitable as long as it contains the essential nutrients for the growth of the microorganism strain employed. Such nutrients are well known in the art and include substances such as a carbon source, a nitrogen source, inorganic compounds and the like which are utilized by the microorganism employed in appropriate amounts.

The fermentation in connection with the present invention is conducted in an aqueous nutrient medium containing a hydrocarbon or a mixture of hydrocarbons as the main carbon source. Such hydrocarbons include straight and branched-chain paraffins (alkanes) having from 10 to 25 carbon atoms, such as n-decane, n-dodecane, n-hexadecane, etc. Other hydrocarbons which may be employed include cycloparaffins such as cyclohexane and cyclooctane, straight- and branched-chain olefins such as pentene-2, hexene-1, octene-1, octene-2, etc., cycloolefins such as cyclohexene, aromatic hydrocarbons such as benzene, o-xylene, etc., and mixtures thereof and crude hydrocarbons such as kerosene, light oils, heavy oils, paraffin oils, gaseous hydrocarbons, etc. Especially preferred are n-paraffins having from 11 to 18 carbon atoms, as large quantities of diaminopimelic acid are produced from this starting material.

Small amounts of other carbon sources such as carbohydrates, for example, glucose, fructose, maltose, sucrose, starch, starch hydrolysate, molasses, etc., or any other suitable carbon source such as glycerol, mannitol, sorbitol, organic acids, etc. may be used in the fermentation medium along with the hydrocarbons. As with the hydrocarbons, these substances may be used either singly or in mixtures of two or more.

As a nitrogen source, various kinds of inorganic or organic salts or compounds, such as urea and ammonia or ammonium salts such as ammonium chloride, ammonium sulfate, ammonium nitrate, ammonium phosphate, ammonium carbonate, ammonium acetate, etc., or natural substances containing nitrogen, such as cornsteep liquor, yeast extract, meat extract, fish meal, peptone, bouillon, casein hydrolysates, fish solubles, soy bean meal hydrolysate, etc. may be employed. These substances may also be used either singly or in combinations of two or more.

Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc.

Moreover, it may also be necessary to add certain essential nutrients to the culture medium, depending upon the particular microorganism employed, such as amino acids, for example, aspartic acid, threonine, methionine, etc., and/or vitamins, for example, biotin thiamine, cobalamin and the like. In the case of using a purely synthesized culture medium, thiamine and L-lysine are added thereto.

Fermentation is conducted under aerobic conditions, such as aerobic shaking of the culture or with stirring of a submerged culture, at a suitable temperature, for example, about 25° to 40° C., and a pH of about 6 to 8. It is desirable to keep the pH at around neutral (7.0) during culturing. The pH tends to decrease below 7.0 at the beginning of fermentation and it may become necessary to neutralize the culture medium with a basic substance such as calcium carbonate, ammonia water, sodium hydroxide, ammonium carbonate and the like.

After about 2 to 4 days of culturing under these conditions, considerable amounts of diaminopimelic acid are found to be accumulated in the fermentation liquor. After the completion of fermentation, the diaminopimelic acid may be separated from the culture liquor by conventional means, such as ion exchange resin treatment, precipitation with metallic salts, chromatography, or the like. A most advantageous method for recovering the diaminopimelic acid involves removing the bacterial cells from the fermentation liquor and recovering the product by an ion exchange resin treatment as described in Example 1. In some cases, small quantities of $\alpha$-ketoglutaric acid, aspartic acid, L-glutamic acid, L-serine, L-lysine or other amino acids are simultaneously accumulated in the resultant culture liquor.

The following examples are given merely as illustrative of the present invention and are not to be considered as limiting. Unless otherwise noted, the percentages in the examples and throughout the application are by weight per liter of water.

EXAMPLE 1

Anthrobacter paraffineus No. 2411–U–35 ATCC 21087 (a lysine-requiring strain) is employed as the seed bacterium. This strain is cultured in a yeast-bouillon-agar slant at 30° C. for 24 hours in order to obtain a seed culture.

Twenty ml. portions of a fermentation medium having the following composition are poured into 250 ml. conical flasks, respectively, and sterilized before using:

0.2% $KH_2PO_4$
0.2% $Na_2HPO_4$
0.1% $MgSO_4 \cdot 7H_2O$
0.005% $MnSO_4 \cdot 4H_2O$
0.001% $FeSO_4 \cdot 7H_2O$
0.001% $ZnSO_4 \cdot 7H_2O$
1% $NH_4NO_3$
0.5% yeast extract
5% of a mixture of n-paraffins ($C_{12}$–$C_{14}$)

The pH of the fermentation medium is 7.0. After sterilization, 2% of calcium carbonate, which has been separately sterilized in the dry state, is added to the respective flasks.

The seed culture is then inoculated into the fermentation flasks in an amount of 5% by volume. Ammonia water is appropriately added to the media so as to keep the pH within a range of 6–8 during culturing. Culturing is then carried out with aerobic shaking at 30° C. Table 1 shows the results obtained after culturing for 2 and 4 days, respectively.

TABLE 1

| Culturing time, days | pH | Amount of diaminopimelic acid produced, mg./ml. |
|---|---|---|
| 2 | 5.6 | 4.2 |
| 4 | 5.4 | 10.1 |

One liter of the filtrate obtained by removing the bacterial cells from the culture liquor which results from culturing at 30° C. for 4 days is adjusted to a pH of 2 and then passed through an ion exchange resin [Diaion SK–1 (H-type)]. The resin column is washed with water and eluted with 1 N-ammonia water. Fractions showing a positive reaction to ninhydrin are collected and concentrated under reduced pressure at 40° C. or less. Decolorization thereof is effected with bone carbon and then alcohol (methanol or ethanol) is added thereto. As a result, 8.6 grams of crude crystals of diaminopimelic acid is obtained.

EXAMPLE 2

Brevibacterium ketoglutamicum No. 2473–U–41 ATCC 21089 (a lysine-requiring strain) is used as the seed strain. It is cultured under aerobic conditions with shaking at 30° C. for 24 hours in a bouillon medium in order to obtain a seed culture.

Culturing is carried out under the same conditions and in the same medium as described in Example 1, except that 5% of kerosene instead of the n-paraffin mixture is used as the source of carbon. After 4 days of culturing with aerobic shaking, 2.1 mg./ml. of diaminopimelic acid is found to be accumulated in the fermentation liquor.

EXAMPLE 3

Culturing is carried out under the same conditions and in the same medium as described in Example 1, but with Arthrobacter paraffineus No. 2411–U–118 ATCC 21088 (a lysine-requiring strain) as the seed bacterium. After 4 days of culturing, the amount of diaminopimelic acid accumulated in the culture liquor is 8.0 mg./ml.

EXAMPLE 4

Culturing is carried out under the same conditions and in the same medium as described in Example 1, but with Corynebacterium hydrocarboclastus No. 2438–U29 ATCC 21090 (a lysine-requiring strain) as the seed bacterium. After 4 days of culturing, the amount of diaminopimelic acid accumulated in the culture liquor is 7.5 mg./ml.

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing diaminopimelic acid which comprises culturing a microorganism capable of producing diaminopimelic acid and belonging to a species selected from the group consisting of Arthobacter paraffineus, Corynebacterium hydrocarboclastus and Brevibacterium ketoglutamicum, said microorganism requiring lysine for its growth under aerobic conditions in an aqueous nutrient medium containing at least one hydrocarbon as the main carbon source, and accumulating and isolating said diaminopimelic acid from the resultant culture liquor.

2. The process of claim 1, wherein said hydrocarbon is an aliphatic hydrocarbon of 10 to 25 carbon atoms.

3. The process of claim 1, wherein said hydrocarbon is an n-paraffin.

4. The process of claim 3, wherein said n-paraffin contains from 11 to 18 carbon atoms.

5. The process of claim 1, wherein said hydrocarbon is selected from the group consisting of kerosene, light oils, heavy oils, paraffin oils, naphtha and mixtures thereof.

6. The process of claim 1, wherein said nutrient medium also contains thiamine and L-lysine.

7. The process of claim 1, wherein culturing is carried out at a temperature of from about 25° to 40° C. and at a pH of about 6 to 8.

8. A process for producing diaminopimelic acid which comprises culturing a microorganism selected from the group consisting of *Arthrobacter paraffineus* ATCC 21087, *Arthrobacter paraffineus* ATCC 21088, *Corynebacterium hydrocarboclastus* No. 2438–U–29 ATCC 21090, and *Brevibacterium ketoglutamicum* ATCC 21089, under aerobic conditions in an aqueous nutrient medium containing at least one hydrocarbon as the main carbon source, and accumulating and isolating said diaminopimelic acid from the resultant culture liquor.

9. The process of claim 8, wherein culturing is carried out at a temperature of from about 25° to 40° C. and at a pH of about 6 to 8.

10. The process of claim 9, wherein said hydrocarbon is an n-paraffin.

11. The process of claim 10, wherein said n-paraffin contains from 11 to 18 carbon atoms.

12. The process of claim 9, wherein said hydrocarbon is selected from the group consisting of kerosene, light oils, heavy oils, paraffin oils, naphtha and mixtures thereof.

13. The process of claim 9, wherein said nutrient medium also contains thiamine and L-lysine.

14. The process of claim 9, wherein the isolation of the diaminopimelic acid is carried out by an ion exchange resin treatment.

References Cited

UNITED STATES PATENTS 3,222,258   12/1965   Iizuka et al. _____ 195—29

OTHER REFERENCES

Nakayama et al.: Journal of General Applied Microbiology, vol. 7, No. 1, 1961, pp. 41 to 51.

LIONEL M. SHAPIRO, Primary Examiner